US009674252B2

(12) United States Patent
Mantin et al.

(10) Patent No.: US 9,674,252 B2
(45) Date of Patent: Jun. 6, 2017

(54) SYSTEM AND METHOD FOR EFFICIENT DELIVERY OF REPETITIVE MULTIMEDIA CONTENT

(71) Applicant: imVision Software Technologies Ltd., Ramat Gan (IL)

(72) Inventors: Sharon Mantin, Tel Aviv (IL); Ofir Amir, Binyamina (IL); Yossi Barshishat, Ashdod (IL)

(73) Assignee: Imvision Software Technologies Ltd., Ramat Gan (IL)

( * ) Notice: Subject to any disclaimer, the term of this patent is extended or adjusted under 35 U.S.C. 154(b) by 146 days.

(21) Appl. No.: 14/611,598

(22) Filed: Feb. 2, 2015

(65) Prior Publication Data

US 2015/0172345 A1    Jun. 18, 2015

Related U.S. Application Data

(63) Continuation-in-part of application No. 14/332,712, filed on Jul. 16, 2014, now Pat. No. 9,432,731, and a continuation-in-part of application No. 14/458,461, filed on Aug. 13, 2014.
(Continued)

(51) Int. Cl.
*H04L 12/28* (2006.01)
*H04L 12/56* (2006.01)
(Continued)

(52) U.S. Cl.
CPC ............ *H04L 65/60* (2013.01); *H04L 65/80* (2013.01); *H04L 67/10* (2013.01);
(Continued)

(58) Field of Classification Search
CPC ......... H04L 65/60; H04L 65/80; H04L 67/10; H04N 21/2225; H04N 21/26616;
(Continued)

(56) References Cited

U.S. PATENT DOCUMENTS 7,082,142 B1   7/2006  Begeja
7,698,724 B1   4/2010  Day
(Continued)

FOREIGN PATENT DOCUMENTS

JP    2004080566 A    3/2004
WO    2013037032 A1   3/2013

OTHER PUBLICATIONS

Bouten et al., "A Multicast-Enabled Delivery Framework for QoE Assurance of Over-The-Top Services in Multimedia Access Networks"; Journal of Network and Systems Management, DOI 10.1007/s10922-013-9262-8, published online Jan. 17, 2013; Springer Science+Business Media, New York.
(Continued)

*Primary Examiner* — Chuong T Ho
(74) *Attorney, Agent, or Firm* — M&B IP Analysts, LLC

(57) ABSTRACT

A system and method for off-loading the serving of repetitive content by a streaming server are presented. The method includes establishing a plurality of unicast transport-layer sockets with a plurality of end-user devices; receiving a plurality of requests for a multimedia content from the plurality of end-user devices, wherein the plurality of requests are session-layer requests; determining if the received plurality of requests are for a repetitive content; and upon determination that the received plurality of requests are for the repetitive content: opening a single socket with a streaming application of at least one streaming server; retrieving a single copy of the requested multimedia content from the streaming application over the single socket; and streaming the retrieved single copy to the plurality of end-user devices through their respective plurality of unicast transport-layer sockets.

26 Claims, 7 Drawing Sheets

Related U.S. Application Data

(60) Provisional application No. 61/934,722, filed on Feb. 1, 2014, provisional application No. 61/847,557, filed on Jul. 17, 2013, provisional application No. 61/865,401, filed on Aug. 13, 2013.

(51) Int. Cl.

| | |
|---|---|
| *H04L 29/06* | (2006.01) |
| *H04L 29/08* | (2006.01) |
| *H04N 21/2187* | (2011.01) |
| *H04N 21/2225* | (2011.01) |
| *H04N 21/266* | (2011.01) |
| *H04N 21/61* | (2011.01) |
| *H04N 21/6405* | (2011.01) |
| *H04N 21/6408* | (2011.01) |
| *H04N 21/643* | (2011.01) |
| *H04N 21/20* | (2011.01) |

(52) U.S. Cl.
CPC ..... *H04N 21/2187* (2013.01); *H04N 21/2225* (2013.01); *H04N 21/26616* (2013.01); *H04N 21/6125* (2013.01); *H04N 21/6405* (2013.01); *H04N 21/6408* (2013.01); *H04N 21/64322* (2013.01); *H04N 2021/225* (2013.01)

(58) Field of Classification Search
CPC ........... H04N 21/6125; H04N 21/6405; H04N 21/64322; H04N 21/6408; H04N 21/2187; H04N 2021/225
USPC .................. 370/390, 392, 389; 709/204, 219
See application file for complete search history.

(56) References Cited

U.S. PATENT DOCUMENTS

| | | |
|---|---|---|
| 8,117,259 B2 | 2/2012 | MacWan |
| 8,826,349 B2 | 9/2014 | Joe et al. |
| 2005/0037740 A1* | 2/2005 | Smith ............... H04L 29/12113 455/414.1 |
| 2008/0114882 A1* | 5/2008 | Christenson .......... H04L 69/162 709/228 |
| 2009/0300185 A1 | 12/2009 | Letellier et al. |
| 2010/0077438 A1 | 3/2010 | Ansari |
| 2010/0211794 A1 | 8/2010 | Bilobrov |
| 2010/0250772 A1 | 9/2010 | Mao |
| 2010/0281105 A1* | 11/2010 | Sebastian ............ H04L 12/1859 709/203 |
| 2012/0131623 A1 | 5/2012 | McDysan et al. |
| 2012/0157043 A1* | 6/2012 | LaJoie ............... G06Q 30/0256 455/407 |
| 2012/0198506 A1 | 8/2012 | Joe et al. |
| 2012/0317605 A1 | 12/2012 | Brogan |
| 2013/0067109 A1 | 3/2013 | Dong et al. |
| 2013/0070622 A1 | 3/2013 | Degioanni et al. |
| 2013/0108173 A1 | 5/2013 | Lienhart et al. |
| 2013/0132986 A1 | 5/2013 | Mack et al. |
| 2013/0268986 A1* | 10/2013 | Venkatachalam .. H04N 21/2365 725/109 |
| 2013/0276017 A1 | 10/2013 | Walker et al. |
| 2013/0276035 A1 | 10/2013 | Walker et al. |
| 2014/0129570 A1 | 5/2014 | Johnson |
| 2014/0129680 A1* | 5/2014 | Mukherjee ............ H04L 65/607 709/219 |
| 2014/0348165 A1 | 11/2014 | Frydman et al. |
| 2015/0049762 A1 | 2/2015 | Mantin |
| 2015/0201225 A1 | 7/2015 | Yin |
| 2015/0331942 A1 | 11/2015 | Tan |

OTHER PUBLICATIONS

The International Search Report and the Written Opinion of the International Search Authority, PCT/US2014/046850, Date of Mailing Oct. 16, 2014.

* cited by examiner

SYSTEM AND METHOD FOR EFFICIENT DELIVERY OF REPETITIVE MULTIMEDIA CONTENT

CROSS-REFERENCE TO RELATED APPLICATIONS

This application claims the benefit of U.S. Provisional Application No. 61/934,722 filed on Feb. 1, 2014. This application is also a continuation in part (CIP) application of:

1) U.S. patent application Ser. No. 14/332,712 filed on Jul. 16, 2014, which claims the benefit of U.S. provisional Application No. 61/847,557 filed on Jul. 17, 2013; and 2) U.S. patent application Ser. No. 14/458,461 filed on Aug. 13, 2014, which claims the benefit of U.S. Provisional Application No. 61/865,401 filed on Aug. 13, 2013. The contents of above-mentioned applications are hereby incorporated by reference.

TECHNICAL FIELD

The present disclosure relates generally to repetitive over-the-top (OTT) streams delivery, and more particularly to methods and systems for highly efficient streaming of repetitive content over content delivery networks (CDNs).

BACKGROUND

The world of digital delivery of multimedia content to viewers has been rapidly progressing. Typical types of multimedia content include video clips, electronic games, and interactive content. The delivery process for such multimedia content, particularly those transmitted in a form of video, may entail use of a variety of delivery standards, video quality levels, and other parameters. The techniques used in traditional television (TV) broadcast cannot be effectively used in the more modern multi-standard digital TV arena. Currently, only piecemeal solutions are available for efficient and seamless delivery of such multimedia content, to the arena of digital TV.

Specifically, content delivery is currently performed using two approaches: legacy content distribution and over-the-top (OTT) content distribution. Legacy content providers include, for example, cable, satellite, and internet protocol TV (IPTV) providers. Typically, such providers have full control over the entire delivery chain from a central location where the content is originated and transmitted (head-end) through the network to the end-user's device (e.g., a set-top box). Therefore, legacy content providers can manage and guarantee efficient content delivery mechanisms and high Quality of Experience (QoE) to the end-user.

Over-the-top (OTT) content distribution is the delivery of audio, video, and other types of multimedia content over the Internet without any control of the content distribution by the network operators and/or by the content providers. The providers of OTT content are third party providers which utilize the network's infrastructure to provide content to their subscribers. As such, OTT content providers are not responsible for controlling redistribution of the content. Examples of OTT content providers are Hulu®, Netflix®, and the like.

Various types of OTT content or streams can be streamed over a network. For example, the type of the streamed content may be live, linear, replicated, or recorded. A live OTT stream is a transmission of a live content (e.g., a sports match, a concert, news, etc.). A linear stream is a broadcasted content, such as a TV show broadcasted over the Internet. In both live and linear OTT streams, all viewers watch the same stream substantially at the same time, and such types of OTT streams will be referred hereinafter as repetitive OTT streams. In contrast, recorded content, such as content from a video on demand (VoD) service, may be viewed by different viewers in asynchronous manners, i.e., each user can start watching the recorded content at any time and the viewing times of users may fully overlap, may partially overlap, or may not overlap at all. As a result of this asynchronicity, existing solutions cannot effectively provide such content to multiple viewers in multicast format, as multicast format typically requires synchronized viewing of the delivered content.

Another type of streamed OTT content refers to the delivery of managed OTT content. This is a type content owned by a network operator that is delivered by the operator or through one of its partners. As such, the network operator controls the media streaming server and, therefore, can determine if the delivered content can be multicasted, as well as the number of concurrent viewers of the streamed content. Managed live and linear OTT content will also be referred to hereinafter as repetitive OTT streams.

To improve Quality of Service (QoS) and Quality of Experience (QoE), repetitive streams may be sent from their originator servers to multiple distributed streaming servers over the Internet. Such streaming servers are known as content delivery networks (CDNs). Upon receipt of a request for a specific repetitive OTT stream from a specific website or a client device, the repetitive OTT stream may be duplicated in the closest CDN streaming server near the clients requesting the respective content. Then, the content is streamed to the requesting client from a CDN's server rather than directly by the originator server. This indirect transmission reduces load on the originator server, required network capacity, and network delay perceived by clients accessing the requested content. As a result, the user's QoEs are enhanced. For each repetitive OTT stream, a CDN streaming server duplicates a single stream of video into multiple streams, with one stream duplicated per client (or user).

Live OTT content consumption is typically characterized by a group of users that consume the same content at the same time. For example, various users simultaneously viewing a live event (e.g., a live show, a sporting event, and so on) may be categorized as viewers of live OTT content. Linear OTT content may also be requested by multiple viewers requesting the same linear video on demand (VoD) content approximately at the same time. CDN operators usually design their servers to support average consumption for serving live content and repetitive content just like the VoD use case, and hence are inefficient.

The ongoing growth of live and/or linear OTT content streaming in society has led to peak in demand (PiD) events involving streaming of resources by CDNs. Such PiD events can overburden the CDN, thereby denying clients access to the content. This denial is particularly significant for live events, which users are not able to watch or may not desire to watch after the initial live showing.

To address the issues caused by PiD events, CDN operators can design streaming capacity of their servers to maximum capacity respective of expected peaks. Alternatively, CDN operators can implement highly efficient streaming servers which can dramatically increase the streaming capacity during PiD events via optimization of repetitive OTT content during the execution of serving the content to content's end consumers.

FIG. 1 shows a schematic block diagram of a conventional streaming server 100 utilized to stream live OTT content. Several end-user (or client) devices 150 are connected to a live streaming server 100 via a unicast communication channel 155. An end-user device 150 may be, for example, a smart phone, a tablet computer, a personal computer (PC), and the like.

In a conventional implementation, the live streaming server 100 executes a streaming application 120, which is responsible for handling business logic and the delivery of live OTT content to the devices 150. To this end, the streaming application 120 is typically configured to open and manage a Transmission Control Protocol (TCP) socket, receive and analyze an input request for specific content, read the requested content from a local disk (not shown), and send "chunks" of the requested content to TCP socket. These actions are performed per end-user device 150, hence resulting with a non-scalable solution.

In some conventional implementations, the streaming application 120 is executed in the user space 110, while the streaming server's 100 hardware is abstracted by the operating system kernel 160 using different kernel modules, such as an IP networking subsystem 130. All kernel modules, and particularly the IP networking subsystem 130, typically reside in a kernel space 165, and the streaming application 120 can only communicate with such kernel modules using system calls via APIs, such as a socket API 121. An example of such an API is a BSD sockets API.

The streaming application 120 creates and manages TCP sockets 122. Each socket 122 designates a single TCP stream per user connection. The streaming application 120 sends multiple copies of the same live content data over each TCP socket 122 to the kernel IP networking subsystem 130. The IP networking subsystem 130 delivers the data to the device driver 140 via a device driver API 131 and sockets 132. Typically, the device driver 140 passes the data using proprietary hardware API to a network interface card (NIC) 145 for delivery over the unicast communication channel 155.

An operating system (not shown) of the end-user device 150 has no information regarding the actual data being sent by the streaming application 120. Further, the streaming application 120 has no means to inform the operating system of the end-user device 150 of any special properties of the transmitted data, such as if the data is a live or linear stream. Therefore, the streaming application 120 and operating system of the end-user device 150 cannot optimize the content being delivered to the end-user devices 150.

One major drawback of conventional streaming servers is that streams of the same live/linear content are replicated for each end-user device 150 requesting the content. Specifically, sending multiple copies of the same content to multiple end-user devices 150 from an application residing in the user space 110 to the kernel space 165 is inefficient because the inherent data redundancy in repetitive (live/linear) content streaming is not accounted. As a result, a large amount of redundant context switches and data copying between the user space 110 and the kernel space 165 is generated. This redundant generation leads to overloading of the streaming applications, delays in sending streams to end-user devices 150, and increased consumption of processing power.

It would therefore be advantageous to provide a solution that overcomes the deficiencies of the prior art by optimizing the operation of streaming servers operable in CDNs.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosure relates to a system and a method for off-loading the serving of repetitive content by a streaming server. The method includes establishing a plurality of unicast transport-layer sockets with a plurality of end-user devices; receiving a plurality of requests for a multimedia content from the plurality of end-user devices, wherein the plurality of requests are session-layer requests; determining if the received plurality of requests are for a repetitive content; and upon determination that the received plurality of requests are for the repetitive content: opening a single socket with a streaming application of at least one streaming server; retrieving a single copy of the requested multimedia content from the streaming application over the single socket; and streaming the retrieved single copy to the plurality of end-user devices through their respective plurality of unicast transport-layer sockets.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
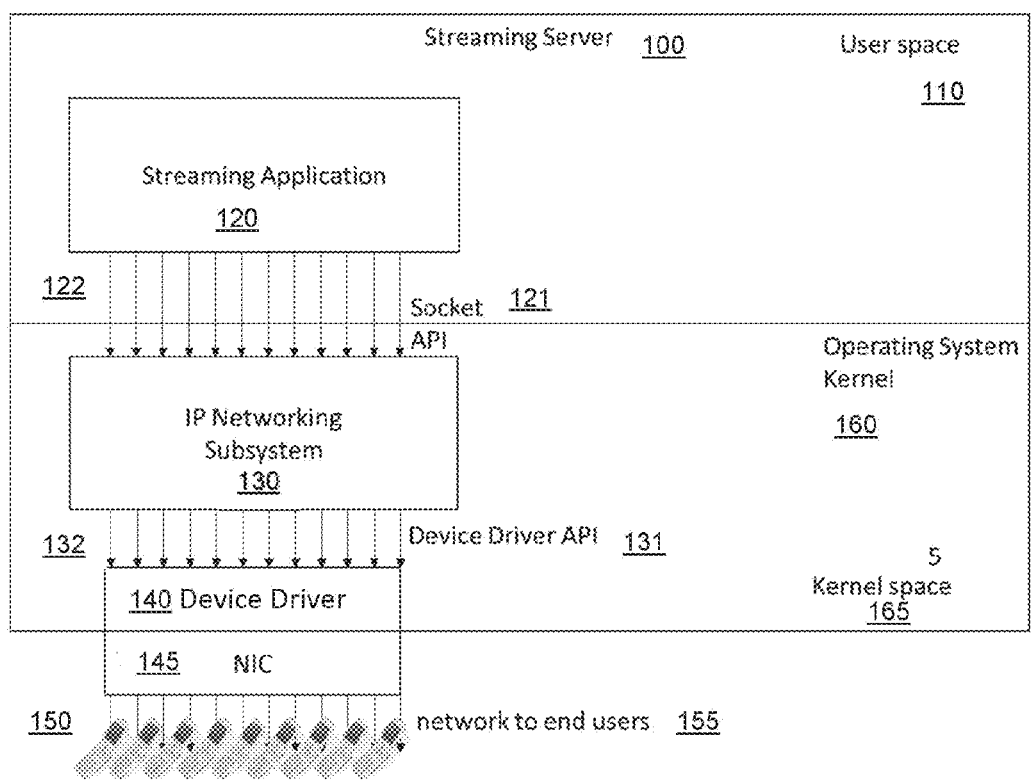
FIG. 1 is a block diagram of a conventional streaming server.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
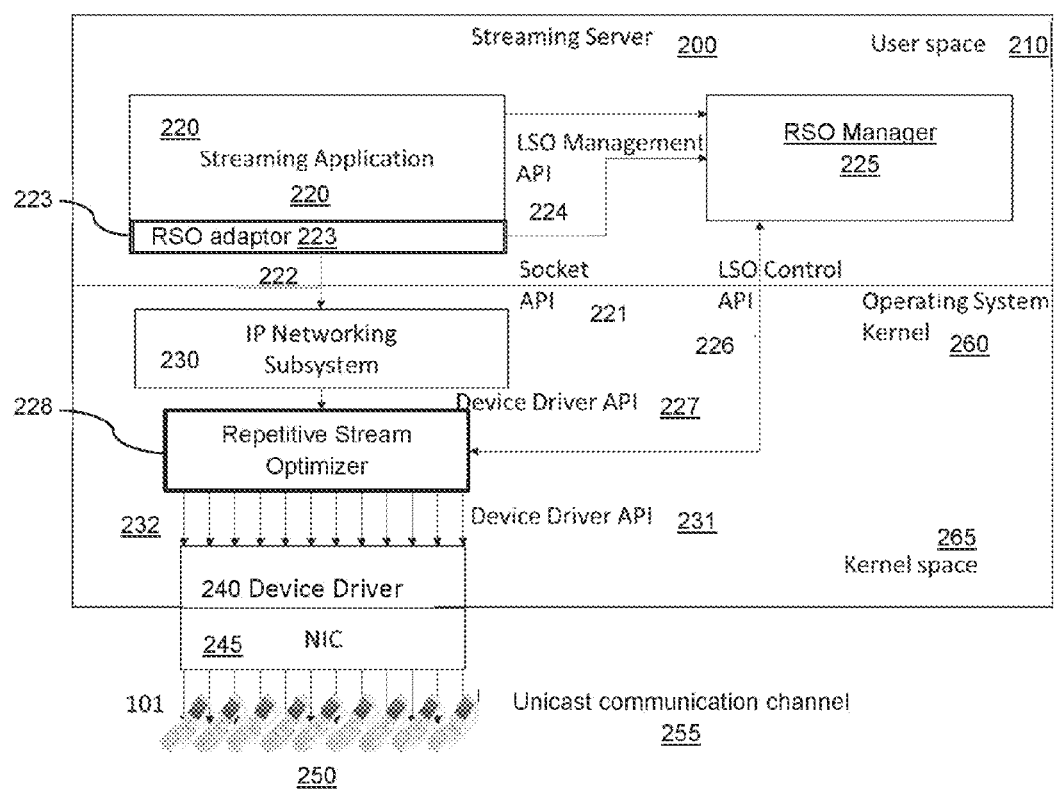
FIG. 2 is a block diagram illustrating a streaming server featuring a repetitive streaming optimizer according to an embodiment.

FIG. 2 shows an exemplary and non-limiting block diagram illustrating a streaming server 200 implemented according to one embodiment. The streaming server 200 is configured to efficiently stream repetitive or duplicated OTT content to a plurality of end-user devices 250 (hereinafter referred to collectively as end-user devices 250 or individually as an end-user device 250) connected thereto via a unicast communication channel 255. The end-user devices 250 may include, for example, smart phones, tablet computers, personal computers, laptop computers, and the like. A repetitive OTT stream may include, for example, a live, linear, duplicated, replicated, recorded OTT multimedia content, or any other type of duplicated content. The repetitive OTT stream or content may be, for example, a managed stream or an unmanaged stream. The managed stream is delivered by the operator or through one of its partners. As such, the network operator may control the streaming server and, therefore, can determine if the delivered content can be multicasted, as well as the number of concurrent viewers of the streamed content. In contrast, for unmanaged streams the network operator does not have any information regarding the type of the content being streamed or the number of concurrent viewers.

It should be noted that the disclosed embodiments will be described herein with reference to a specific embodiment of handling requests for repetitive OTT streams or content. However, it should be noted that the disclosed embodiments are applicable to any type of content that can be streamed by the streaming server 200.

The streaming server 200 includes a streaming application 220, which is responsible for handling business logic and the delivery of repetitive video content to the end-user devices 250. Business logic performed by the streaming application 220 involves encoding real-world business rules that determine how data can be created, displayed, stored, and changed. As noted above, the streaming application 220 is typically configured to accept, open, and manage, per end-user device, a transport layer socket, receive and analyze a request for specific content, read the requested content from a storage or memory (not shown), and send "chunks" of the requested content to socket. The streaming application 220 is typically executed in the user space 210.

The hardware of the streaming server 200 is abstracted by the operating system kernel 260 using different kernel modules such as, for example, an IP networking subsystem 230 that abstracts the network interface cards (NICs) for the user space application through the use of sockets APIs. In certain configurations, the kernel modules, including the IP networking subsystem 230, may reside in a kernel space 265, and the streaming application 200 typically communicates with kernel modules using system calls via APIs (e.g., a socket API 221).

According to the disclosed embodiments, the user space 210 of the streaming server 200 also includes a repetitive stream optimizer (RSO) 228 configured to perform some of the optimization techniques disclosed in detail herein. Specifically, in an embodiment, the RSO 228 is configured to receive or otherwise capture a request for content from an end-user device 150. Such a request may be received over a unicat transport layer socket opened or established with the respective end-user device 150. The transport layer socket may include, for example, transmission control protocol (TCP) or a UDP socket. The RSO 228 determines if the request is for a repetitive OTT content and requests the content from the streaming application 220. The repetitive OTT content is maintained by the RSO 228. That is, the RSO 228 can store a copy of the repetitive OTT content received from the streaming application 220 in a cache memory, a local disk, a RAM, and the like, of the streaming server 200.

Any subsequent request for the same repetitive OTT content by one or more different end-user devices 150 is served by the RSO 228. That is, per end-user request, the RSO indicates the RSO 228 to duplicate the stored copy of the repetitive OTT content received from the streaming application 220 and does not need to request such content from the application 220.

The optimization technique performed by the RSO 228 reduces the processing load at the stream application 220 and allows the stream application 220 to simultaneously stream repetitive OTT content to multiple end-user devices 250 without delay or with minimal delay, thereby improving the overall performance of the streaming server 200.

In detail, the duplication of OTT content occurs in the kernel space 265 rather than in the user space 210. As such, the streaming application 220 only receives one request to provide repetitive OTT content requested by the multiple end-user devices 250 such that the streaming application 220 is freed to perform tasks other than transferring data from the user space 210 to the kernel space 265. In addition, unlike in existing solutions where a streaming application 120 creates and manages a plurality of sockets (e.g., the sockets 122) with the streaming application 120, according to the disclosed embodiment only a single socket 222 is created and managed by the streaming application 220. The socket 222 designates or abstracts a single TCP stream for all end-user devices' 250 connections. The streaming application 220 sends a single copy of the repetitive OTT content over the socket 222 to the IP networking subsystem 230. The IP networking subsystem 230 identifies the RSO 228 as a device driver and delivers the content to the RSO 228 via a device driver API 227.

The RSO 228 is configured to send a copy of the repetitive OTT content to a device driver 240 via one of a plurality of unicast transport layer (e.g., a TCP or UDP) sockets 232. The device driver 240 passes the content to a NIC 245 for delivery over a unicast communication channel 255 connecting an end-user device 250 to the streaming server 200. In an embodiment, the RSO 228 may send the data to the device driver 240 using optimized transmission techniques utilized by the driver 240. A non-limiting example for such a technique is the zero copy.

In some non-limiting embodiments, the streaming server 200 may further include a RSO manager 225 configured to transmit optimized repetitive streams. In other non-limiting embodiments, an external RSO manager (not shown) may reside in an external server (not shown). The RSO manager 225 may communicate with the streaming application 220 via a management API 224 and may communicate with the RSO 228 via a control API 226.

In another non-limiting embodiment, the streaming application 220 may be communicatively connected to a RSO adaptor 223. The RSO adaptor 223 is configured to permit communication between the streaming application 220 and other components of the streaming server 200. Specifically, data may be sent from the streaming application 220 to the RSO adaptor 223 prior to subsequent transfer to, for example, the RSO manager 225 and/or the IP networking subsystem 230.

In an embodiment, the RSO adaptor 223 may be used when, for example, the RSO 228 is implemented in existing streaming servers that cannot be modified. In such a case, the RSO adaptor 223 can be automatically loaded, thereby implementing the RSO manager 225 independently of the streaming application 220. In one embodiment, the RSO adaptor 223 can perform the task of detecting a request for a repetitive stream instead of the RSO 228. One technique for detecting repetitive streams includes analyzing a received request for an OTT stream, requesting a plurality of time-shifted OTT streams respective of the requested OTT stream when the analysis of the received request indicates that the requested OTT stream is suspected as a repetitive OTT stream; and analyzing the plurality of time-shifted OTT streams. The analysis of a suspected live OTT stream results in a definitive indication of whether the requested OTT stream is a repetitive OTT stream. This technique is discussed in more detail in the above-referenced U.S. patent application Ser. No. 14/332,712, assigned to common assignee, which is hereby incorporated by reference.

In another embodiment, the RSO adaptor 223 and/or the RSO 228 perform self-detection of real-time popular recorded over-the-top streams and determine the efficiency of transmitting such streams as multicast streams. To this end, according to an exemplary embodiment, the detection is performed if the number of requests during a preconfigured time frame to a specific recorded OTT stream exceeds a predefined threshold. As a non-limiting example, a popular stream may be a stream which has received over 1,000 requests in the past hour. Upon detection of a real-time popular recorded OTT stream, the efficiency of transmitting such a stream as a multicast stream is determined based, in part, on the number of requests for the recorded stream from a certain starting time. This technique is discussed in more detail in the above-referenced U.S. patent application Ser. No. 14/458,461, assigned to common assignee, which is hereby incorporated by reference for all that it contains.

It should be noted that the RSO 228, the RSO adaptor 223, and the RSO manager 225 may be implemented as stand-alone components external to the streaming server 200. The implementation of the RSO 228, the RSO adaptor 223, and the RSO manager 225 may be realized as a physical appliance, a virtual appliance, or any combination thereof. When implemented in the streaming server 200, the RSO 228, the RSO adaptor 223, and the RSO manager 225 can be realized in software, hardware, firmware, or any combination thereof.

According to various disclosed embodiments, the solution for optimizing the transmissions of repetitive OTT content streams can be scalable using a plurality of RSO extenders. This further improves the performance of the streaming server 200, specifically when the server is inundated with requests for repetitive OTT content, for example, during a large-scale sports event. In such a case, the RSO manager 225 may utilize one or more RSO extenders that it is communicatively connected to. In a typical case, such RSO extenders do not reside sequentially along nodes in a network. Rather, the RSO 225 will typically reside in a topology that enables load balancing between the servers, resiliency of servers, and so on. Furthermore, such RSO 225 may utilize RSO extenders using a software defined network or network functions virtualization network as described further herein below with respect to FIGS. 3 and 7.

Figure 3:
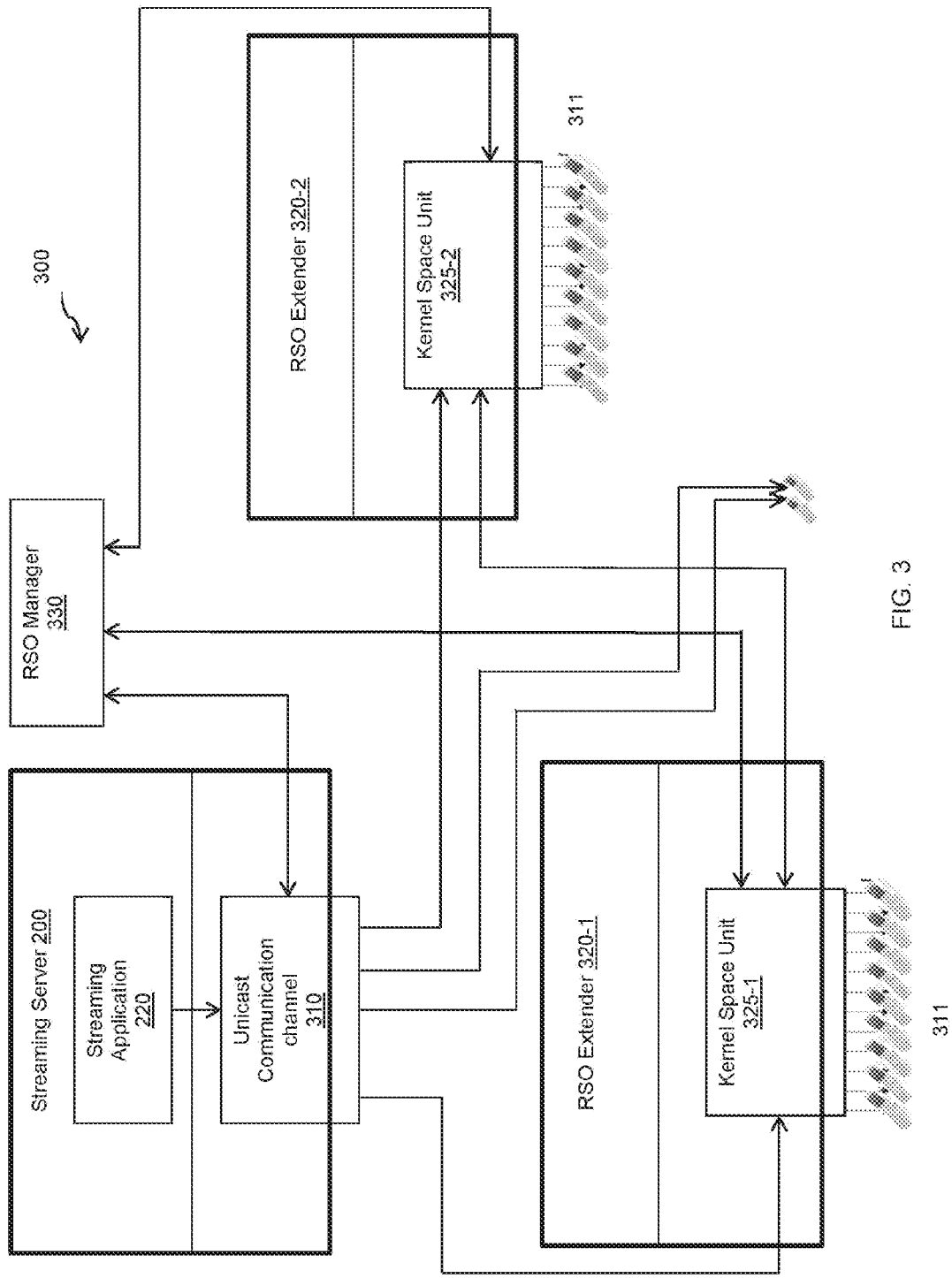
FIG. 3 is a block diagram of a repetitive streaming optimizer which implements several live streaming optimizer extenders according to an embodiment.

FIG. 3 shows an exemplary and non-limiting diagram 300 illustrating the utilization of a plurality of RSO extenders 320-1 through 320-n (hereinafter RSO extenders 320 or individually as RSO extender 320) according to one embodiment. In one configuration, a RSO manager 330 is connected to the streaming server 200. The streaming server 200 includes the RSO 228 and the RSO adaptor 223 as discussed in detail above. According to this embodiment, one or more RSO extenders 320 and one or more end-user devices 311 are connected to the RSO 228 and, therefore, to the streaming server 200. The connection is through a unicast communication channel 310. Each RSO extender 320 implements the functionality of the RSO 228 and provides duplicated copies of repetitive OTT content to end-user devices 311 connected thereto via kernel space units 325-1 through 325-n (hereinafter kernel space units 325 or individually as a kernel space unit 325).

In this exemplary and non-limiting embodiment, the RSO manager 330 is external to the streaming server 200 and controls the RSO 228 as well as the RSO extenders 320. The streaming application 220 of the streaming server 200 may operate as discussed herein above with respect to FIG. 2. That is, a single socket is opened with the RSO 228 such that the repetitive OTT content is requested only once from the streaming applications.

In this embodiment, the RSO manager 330 is configured to determine if the request for OTT content that is for a repetitive OTT content should be served via the output socket sending content. That is, it is determined whether the requested content should be served through the local RSO 228 or through the RSO extenders 320.

The OTT content transmitted to the end-user devices 311 and RSO extenders 320 can be addressed using a "group addressing", a "cascaded list addressing", or combination thereof. Each of the various addressing methods are illustrated in FIGS. 4-6, respectively.

Figure 4:
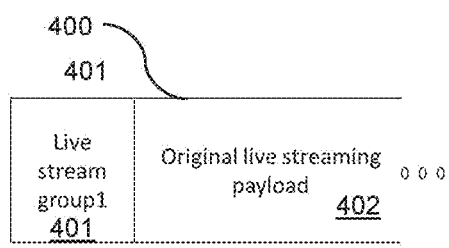
FIG. 4 is a diagram of a data structure illustrating a group addressing according to an embodiment.

FIG. 4 is an exemplary and non-limiting diagram of a data structure 400 utilized for group addressing according to an embodiment. In this embodiment, the stream content is encapsulated in the data structure 400. The data structure 400 includes an address designator 401 prefixed by a payload 402. The address designator 401 specifies a group identifier (ID) of devices and/or extenders belonging to the group. Each group is designated by a unique group identification. The repetitive OTT streaming content data is included in the payload 402. According to this embodiment, the content in the payload 402 is sent to all members, i.e., end-user devices and extenders associated with a group designated by the group ID in the address designator 401.

Figure 5:
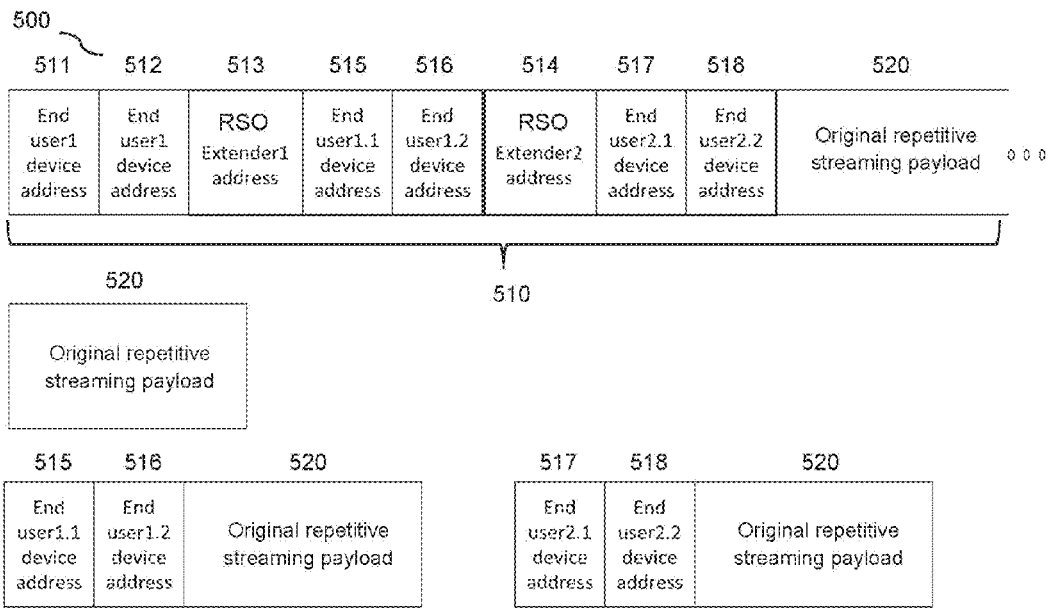
FIG. 5 is a diagram of a data structure illustrating a cascaded list addressing according to an embodiment.
Figure 6:
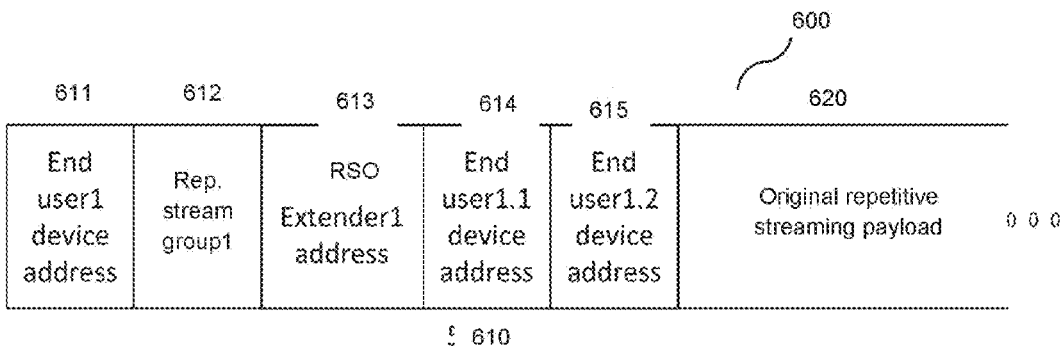
FIG. 6 is a diagram a data structure illustrating the combined group and cascaded list addressing according to an embodiment.

FIG. 5 is an exemplary and non-limiting diagram of a data structure 500 illustrating a cascaded list addressing according to an embodiment. The data structure 500 includes an address designator 510 prefixed by an original repetitive streaming payload 520. In this embodiment, the addresses of end-users' devices and the addresses of RSO extenders are sent to the RSO.

The RSO, in response, generates 4 different streams: 2 streams with the original repetitive streaming payload 520 are sent to addresses of end-user devices 511 and 512. The data stream in the payload 520 is also addressed to RSO extenders 513 and 514.

The data stream received by RSO extender 513 and the addresses of end-user devices 515 and 516 are extracted and the data in the payload 520 is duplicated. Each duplicated content is sent to the end-user devices 515 and 516. The same process is performed by the RSO extender 514, which duplicates and sends the duplicated content data to the addresses of end-user devices 517 and 518.

In this embodiment, the RSO and each of the RSO extenders is aware only of the session's information of elements in the "next hop" in the path. The "next hop" is an RSO extender or end-user device. As a result, the RSO extenders can be stateless and reduce the amount of required management.

FIG. 6 is an exemplary and non-limiting diagram of a data structure 600 illustrating the combined group and cascaded list addressing according to an embodiment. The data structure 600 includes an address designator 610 prefixed by a payload 620. The address designator 610 includes an address of an individual user device (e.g., device 611), one or more groups of devices designated by their respective group IDs, e.g., group ID 612, and an address of one or more RSO extenders, e.g., RSO extender 613. The address designator 610 to the payload 620 by the streaming application or an RSO adaptor. The RSO generates duplicate content streams as the number of entities designated in the address designator. The duplicated content streams are sent to the respective end-devices 614 and 615, extenders, and grouped devices as discussed above with respect to FIGS. 5 and 6. It should be noted that the combined addressing allows for reduction of the data overhead as compared to the cascaded list addressing and further reduce the management of sessions required in the group addressing method.

Figure 7:
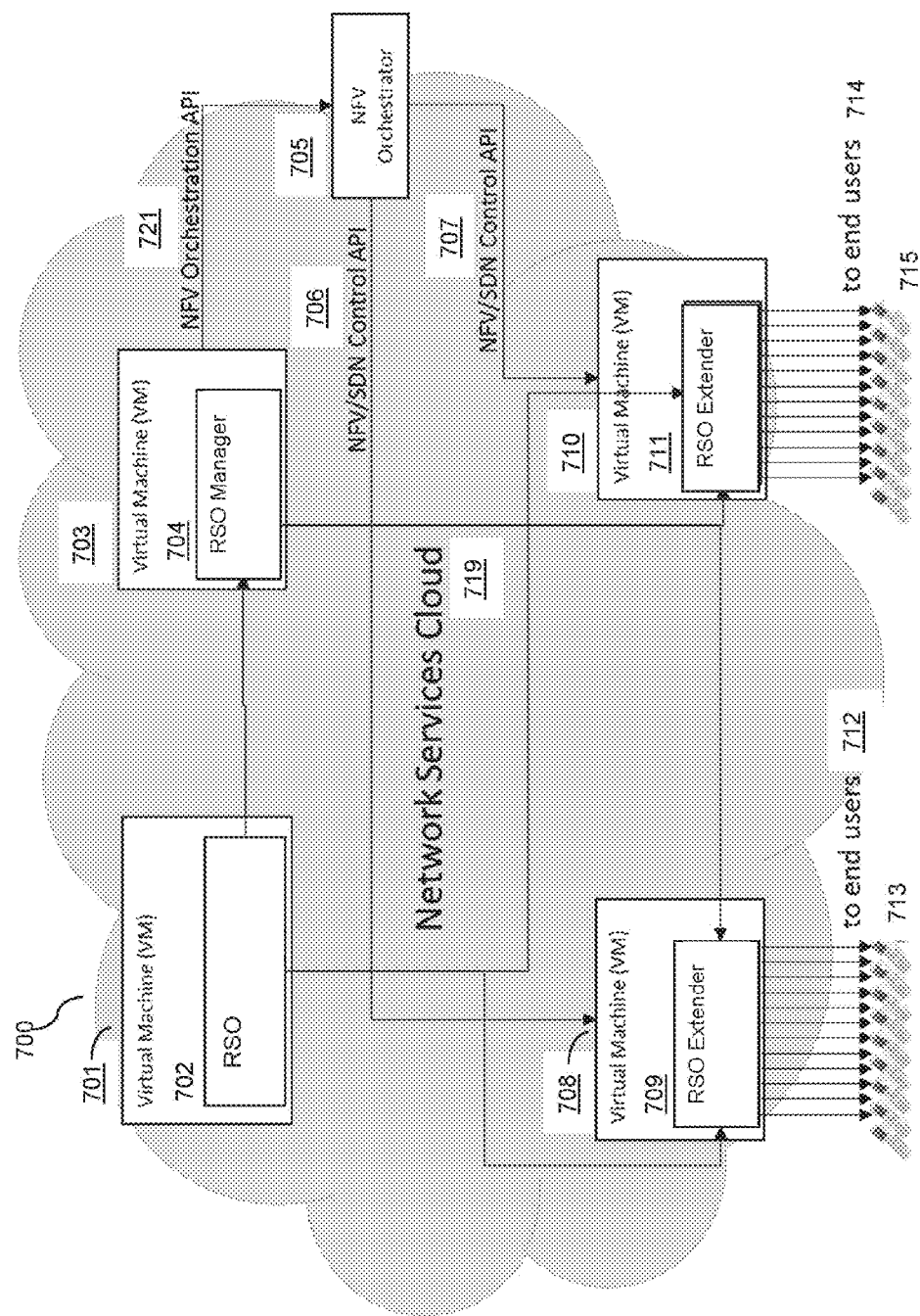
FIG. 7 is a network diagram of a software defined network utilized to perform the various disclosed embodiments.

FIG. 7 is a network diagram of a software defined network (SDN) 700 for optimizing OTT multimedia streams according to one embodiment. In this embodiment, all of the servers are executed on top of a network services cloud 719 of virtual machines in a SDN or other types of virtual networks. According to one configuration, an RSO manager 704 is executed within a virtual machine (VM) 703. In addition, the RSO 702 may be executed within a VM 701.

In an embodiment, the RSO manager 704 can dynamically instantiate additional RSO extenders, such as, but not limited to, RSO extenders 709 and 711. This can be performed by means of a network functions virtualization (NFV) orchestrator 705. The NFV orchestrator 705 is configured to control the VMs 708 and 710 using various control APIs 706, 707, and 721. In a non-limiting embodiment, the control APIs are defined by an OpenFlow protocol which allows the programming of network elements in the SDN 700 by the orchestrator 705. It should be noted that the operation of the streaming application is not modified.

In this exemplary and non-limiting embodiment, the RSO manager 704 is configured to send the repetitive OTT streams via the NFV orchestrator 705 to end-user devices 713. Specifically, the repetitive OTT streams are sent over the network connections 712 from the RSO extender 709 and to the end-users devices 715 over the network connections 714 from RSO extender 711. It should be noted that the RSO manager 704 does not need to be aware of the actual network and cloud physical structure to successfully transmit the repetitive OTT streams.

Figure 8:
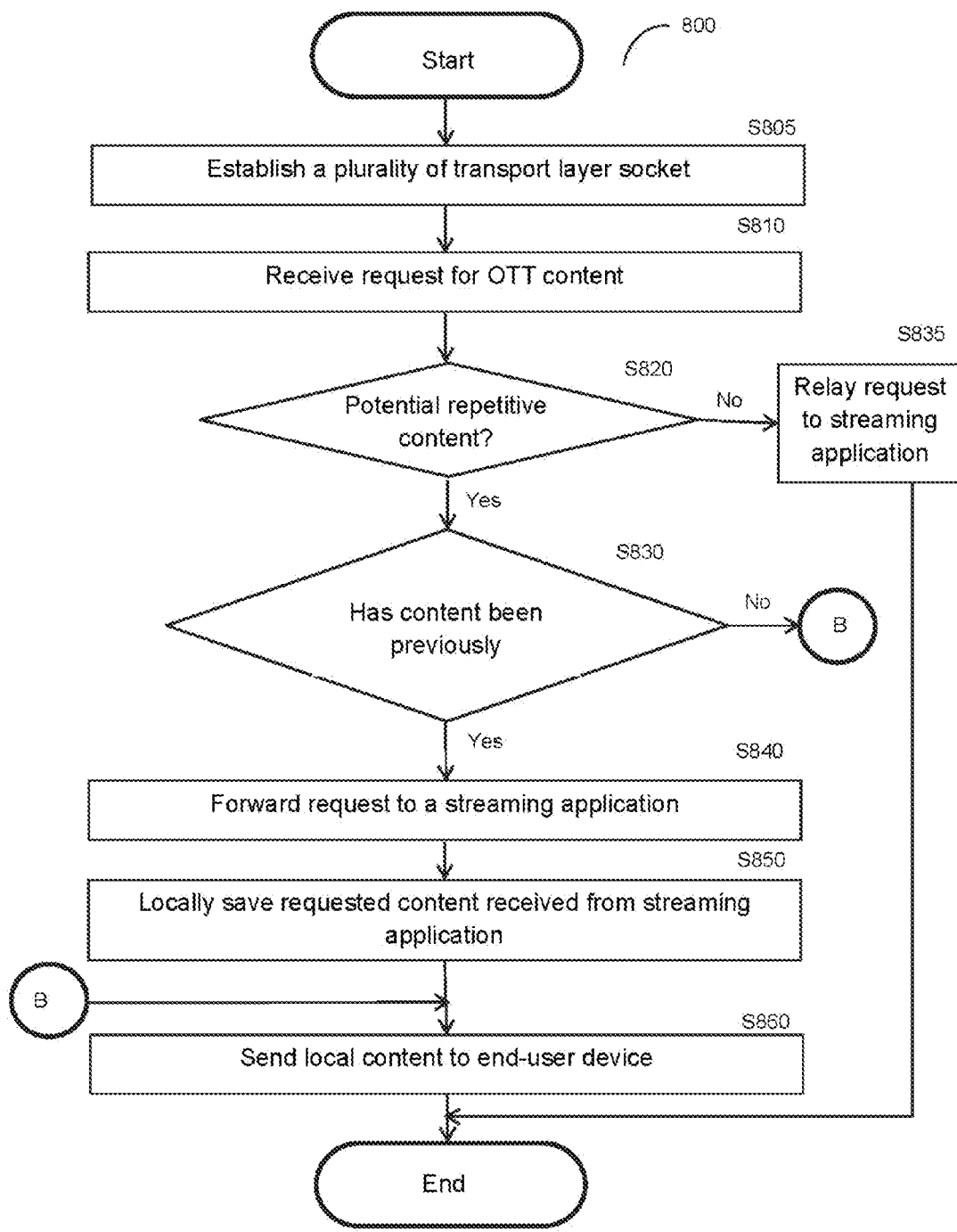
FIG. 8 is a flowchart illustrating a method for optimizing the repetitive OTT stream delivery according to one embodiment.

FIG. 8 is an exemplary and non-limiting flowchart 800 illustrating a method for off-loading the processing of a streaming server according to one embodiment. The method in particular is designed to off-load the processing performed by the streaming application in the user space when handling repetitive OTT streams. As noted above, a repetitive OTT stream includes live, linear, recorded, managed, or unmanaged OTT content, or any other content that can be streamed by a streaming server. The method may be performed by an RSO, an RSO adaptor, an RSO manager, and/or an RSO extender as discussed above.

At S805, a plurality of transport layer sockets is opened with a plurality of user devices. It should be noted each transport layer socket is opened and managed individually per user. At S810, one or more requests for an OTT content are received. Each such request can be received from a user device or a RSO extender that provides a connection to a plurality of user devices. In an embodiment, the request is a session layer request, for example, HTTP, FTP, and on the like. At S820, it is checked if the requested OTT content is a potential repetitive OTT content. Various techniques for detecting repetitive OTT content are discussed above. If S820 results with a 'yes' answer, i.e., the requested content is a repetitive OTT content, execution continues with S830; otherwise, at S835 the request is relayed to streaming application. Then execution ends.

At S830, it is checked if the request is for content previously requested by a different user device. If so, execution continues with S840; otherwise, execution continues with S860. At S840, the request is forwarded to the streaming application in the streaming server. In response, a copy of the requested OTT content is received. In an embodiment, S840 includes opening a single socket with the streaming application. The signal copy of the content is provided over the single socket. At S850, the copy of the requested OTT content is saved locally to serve future requests for the same content. At S860, the content retrieved from processing the application is sent to each of the requesting end-user device or RSO extender through their respective transport layer socket. In an embodiment, S860 includes reading the chunks of the requested content to the respective transport layer socket, and waiting for acknowledgments of the transmitted chunks as defined by a TCP protocol. The content is delivered to each end-user device over a unicast channel.

It should be noted that the content sent to more than one end-user device and/or RSO extender is encapsulated in any of the data structures described further herein above with respect to FIGS. 4-7. It should be further noted that in an exemplary embodiment the method's steps are performed at the kernel space of a streaming server, thereby significantly offloading any processing tasks performed in the user space to serve repetitive content.

Without limiting the scope of the disclosed embodiments, the terms "user space" and "kernel space" have been used herein for exemplary purposes and only to distinguish between the control plane and the data plane, respectively. Advanced server architecture may allow different variations on the separation between the control plane and the data plane. As a non-limiting example, a user space (or user land) implementation such as, but not limited to, an implementation utilizing the Intel® Data Plane Development Kit (DPDK) networking stack as the data plane may be used without departing from the scope of the disclosed embodiments. It should be further noted that the embodiments disclosed herein are described with respect to live streaming functionality merely for simplicity purposes and without limitation on any of the disclosed embodiments. The disclosed embodiments may be utilized respective of linear and other forms of repetitive streaming content as described further herein below without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for off-loading the serving of repetitive content by a streaming server comprising:
   establishing a plurality of unicast transport-layer sockets with a plurality of end-user devices;
   receiving a plurality of requests for a multimedia content from the plurality of end-user devices, wherein the plurality of requests are session-layer requests, wherein any of the plurality of end-user device includes an extender configured to serve a plurality of end-user devices;
   determining if the received plurality of requests is for a repetitive content; and
   upon determination that the received plurality of requests are for the repetitive content:
      opening a single socket with a streaming application of at least one streaming server;
      retrieving a single copy of the requested multimedia content from the streaming application over the single socket, wherein additional extenders can be dynamically instantiated to be streamed by the received single copy of the requested multimedia content; and
      streaming the retrieved single copy to the plurality of end-user devices through their respective plurality of unicast transport-layer sockets.

2. The method of claim 1, further comprising:
   serving any subsequent requests to the repetitive content using the single copy.

3. The method of claim 1, wherein streaming the retrieved single copy to the plurality of end-user devices through their respective plurality of unicast transport-layer sockets further comprises:
   reading the single copy of the multimedia content from a local storage; and
   sending one or more data chunks of the requested multimedia content to the plurality of unicast transport-layer sockets expecting to receive the same one or more data chunks.

4. The method of claim 1, wherein the streaming application is executed in a user space of an operating system of the at least one streaming server.

5. The method of claim 1, wherein the method is performed in a kernel space of an operating system of the at least one streaming server.

6. The method of claim 1, wherein the repetitive content further includes any one of: a live content, a linear content, and a recorded content.

7. The method of claim 1, wherein the requested multimedia content is at least an over-the-top (OTT) content.

8. The method of claim 7, wherein determining if the request for the OTT multimedia content is for a repetitive OTT multimedia content, further comprising:
   analyzing the received request for the OTT multimedia content;
   requesting a plurality of time-shifted OTT streams respective of the requested OTT multimedia content when the analysis of the received request indicates that the requested OTT stream is suspected as a repetitive OTT multimedia content; and
   analyzing the plurality of time-shifted OTT streams to provide a definitive indication of whether the requested OTT stream is a repetitive OTT multimedia content.

9. The method of claim 1, wherein determining if the request for the OTT multimedia content is for a repetitive OTT multimedia content further comprises:
   determining if a number of requests for a specific OTT multimedia content received during a time frame exceeds a predefined threshold.

10. The method of claim 1, wherein streaming the received single copy of the requested multimedia content to the at least one end-user device further comprises:
    streaming the received single copy of the requested multimedia content to the at least one end-user device over a unicast communication channel.

11. The method of claim 1, further comprising:
    addressing the requested multimedia content to at least any one of: a group of end-user devices associated with the same group identifier, a cascade list of at least one extender and a plurality of user devices, and a combined list including the plurality of end-user devices and the cascade list.

12. The method of claim 11, wherein addressing the requested multimedia content is performed using a data structure including an address designator prefixed by a payload, wherein the payload contains the multimedia content.

13. The method of claim 1, wherein the at least one streaming server is operable in at least one of: a software defined network, and a content delivery network.

14. A non-transitory computer readable medium having stored thereon instructions for causing one or more processing units to execute the method according to claim 1.

15. The system of claim 1, wherein the requested multimedia content is at least an over-the-top (OTT) content.

16. The system of claim 15, wherein the system is further configured to:
    determine if a number of requests for a specific OTT multimedia content received during a time frame exceeds a predefined threshold.

17. The system of claim 16, wherein addressing the requested multimedia content is performed using a data structure including an address designator prefixed by a payload, wherein the payload contains the multimedia content.

18. The method of claim 1, wherein retrieving the single copy the requested multimedia content further comprising:
    retrieving a single copy from each of the at least one streaming server.

19. A system comprising:
a processing unit; and
a memory, the memory containing instructions that, when executed by the processing unit, configure the system to:
establish a plurality of unicast transport-layer sockets with a plurality of end-user devices;
receive a plurality of requests for a multimedia content from the plurality of end-user devices, wherein the plurality of requests are session-layer requests, wherein any of the plurality of end-user device includes an extender configured to serve a plurality of end-user devices;
determine if the received plurality of requests is for a repetitive content; and
upon determination that the received plurality of requests are for the repetitive content:
open a single socket with a streaming application of at least one streaming server;
retrieve a single copy of the requested multimedia content from the streaming application over the single socket, wherein additional extenders can be dynamically instantiated to be streamed by the received single copy of the requested multimedia content; and
stream the retrieved single copy to the plurality of end-user devices through their respective plurality of unicast transport-layer sockets.

20. The system of claim 19, wherein the system is further configured to:
serve any subsequent requests to the repetitive content using the single copy.

21. The system of claim 19, wherein the system is further configured to:
read the single copy of the multimedia content from a local storage; and
send one or more data chunks of the requested multimedia content to the plurality of unicast transport-layer sockets expecting to receive the same one or more data chunks.

22. The system of claim 19, wherein the repetitive content further includes any one of: a live content, a linear content, and a recorded content.

23. The system of claim 19, wherein the system is further configured to:
analyze the received request for the OTT multimedia content;
request a plurality of time-shifted OTT streams respective of the requested OTT multimedia content when the analysis of the received request indicates that the requested OTT stream is suspected as a repetitive OTT multimedia content; and
analyze the plurality of time-shifted OTT streams to provide a definitive indication of whether the requested OTT stream is a repetitive OTT multimedia content.

24. The system of claim 23, wherein the system is further configured to:
address the requested multimedia content to at least any one of: a group of end-user devices associated with the same group identifier, a cascade list of at least one extender and a plurality of user devices, and a combined list including the plurality of end-user devices and the cascade list.

25. The system of claim 19, wherein the system is further configured to:
stream the received single copy of the requested multimedia content to the at least one end-user device over a unicast communication channel.

26. The system of claim 19, wherein the at least one streaming server is operable in at least one of: a software defined network, and a content delivery network.

* * * * *